Oct. 6, 1925.  1,556,500
F. DELOISON ET AL
BRAKE SHOE WITH DISTANT ELECTROMAGNETIC CONTROL
Filed Aug. 6, 1924   4 Sheets-Sheet 1

Inventors
F. Deloison
J. Deyon
By Marks&Clerk Attys

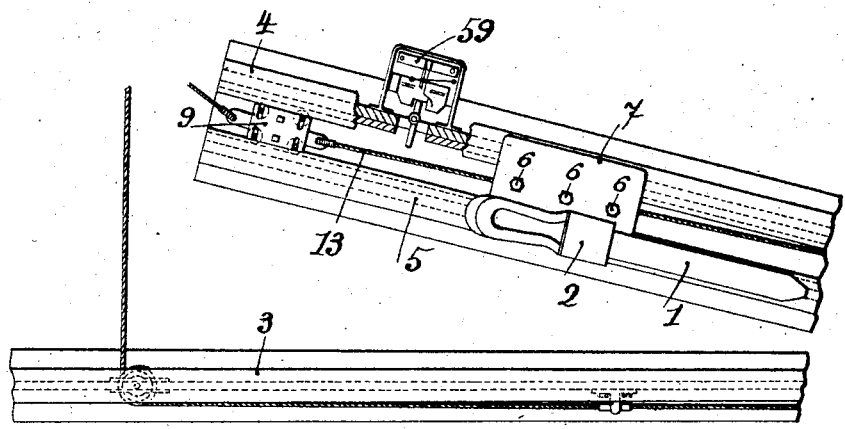
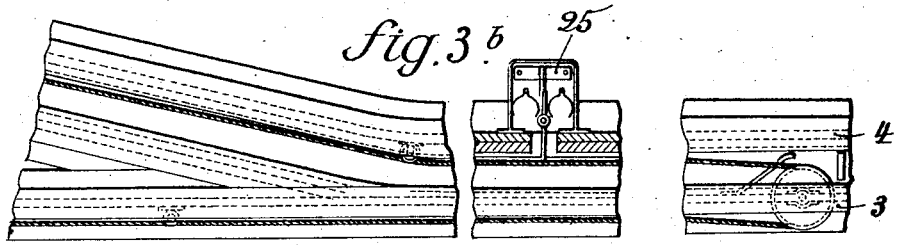
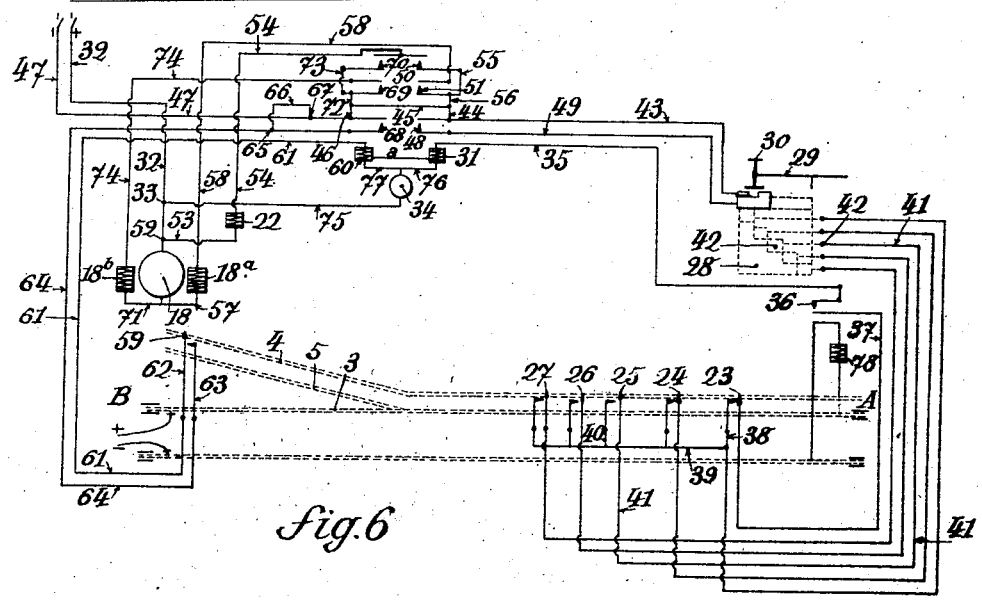

Oct. 6, 1925. 1,556,500
F. DELOISON ET AL
BRAKE SHOE WITH DISTANT ELECTROMAGNETIC CONTROL
Filed Aug. 6, 1924 4 Sheets-Sheet 3

Inventors
F. Deloison
J. Deyon
By Marks Clerk
Attys.

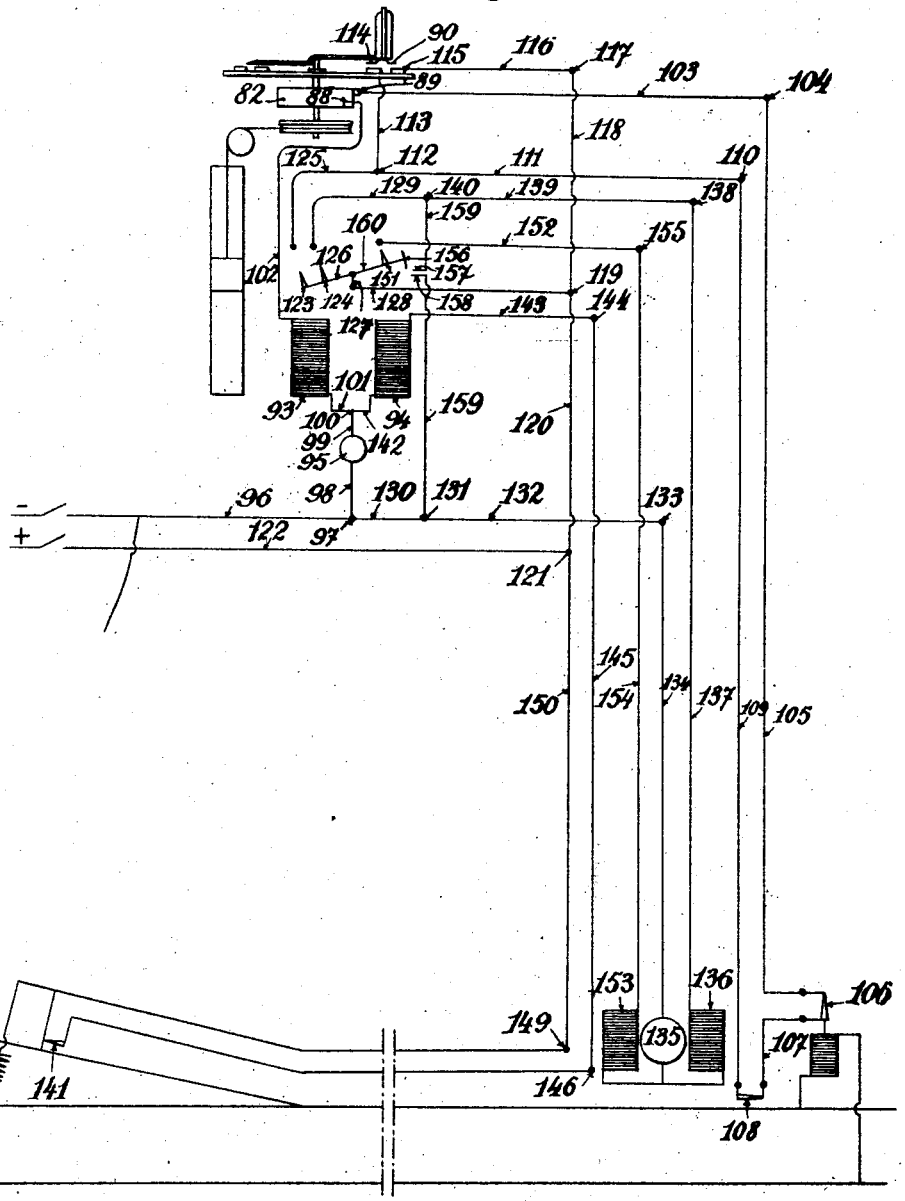

Patented Oct. 6, 1925.

1,556,500

UNITED STATES PATENT OFFICE.

FERNAND DELOISON AND JOSEPH DEYON, OF LOMME, FRANCE.

BRAKE SHOE WITH DISTANT ELECTROMAGNETIC CONTROL.

Application filed August 6, 1924. Serial No. 730,505.

*To all whom it may concern:*

Be it known that we, FERNAND DELOISON and JOSEPH DEYON, both citizens of the Republic of France, and residing at Lomme, Nord Department, No. 10 Rue Chrétien Cite de la Delivrance, in the Republic of France, engineers, have invented certain new and useful Improvements in Brake Shoes with Distant Electromagnetic Control, of which the following is a specification.

The present invention relates to apparatus for the braking of wagons in sorting stations, comprising a brake shoe which is automatically disposed upon one of the rails of the track and upon which the first wheel of the wagon is caused to mount before entraining the same in a sliding motion until the said shoe is deviated by another rail placed in an oblique position, whereby the wagon is allowed to travel at a reduced speed.

According to the invention, the said shoe, which is normally placed upon the siding track, is mechanically drawn upon the main track, in order to meet the wagon, by means of a small carriage which is connected with the two ends of a cable operated by a winch which is driven by an electric motor.

When the said shoe has attained the determined distance, the carriage leaves it upon the track and at once returns in order to assume its original position upon the siding track. The car meets with the said shoe and causes it to slide on the track, finally releasing it by impelling it upon the siding track.

Due to this independent action of the shoe and the carriage, the latter, which is alone connected with the driving mechanism, will not be struck or drawn forward by the wagon, whereby the said driving mechanism might become damaged, this being in fact one of the most complicated and expensive parts of the apparatus. In order to prevent the wagon from meeting the said shoe before the latter is stopped upon the track, a section of insulated rails precedes the said apparatus. As soon as the wagon enters the latter section, the electric motor is stopped and will at once rotate in the opposite direction, thus holding the said shoe in the fixed position upon the track and returning the said carriage to the siding track.

Another feature of the invention consists in automatically placing the said shoe in position by means of a distant control whereby the distance covered by the said shoe is made proportional to the speed of the wagon.

Another feature consists in the release of the shoe upon the main track, by the use of a special guideway.

The appended drawing shows by way of example an embodiment of the said invention.

Figure 3:
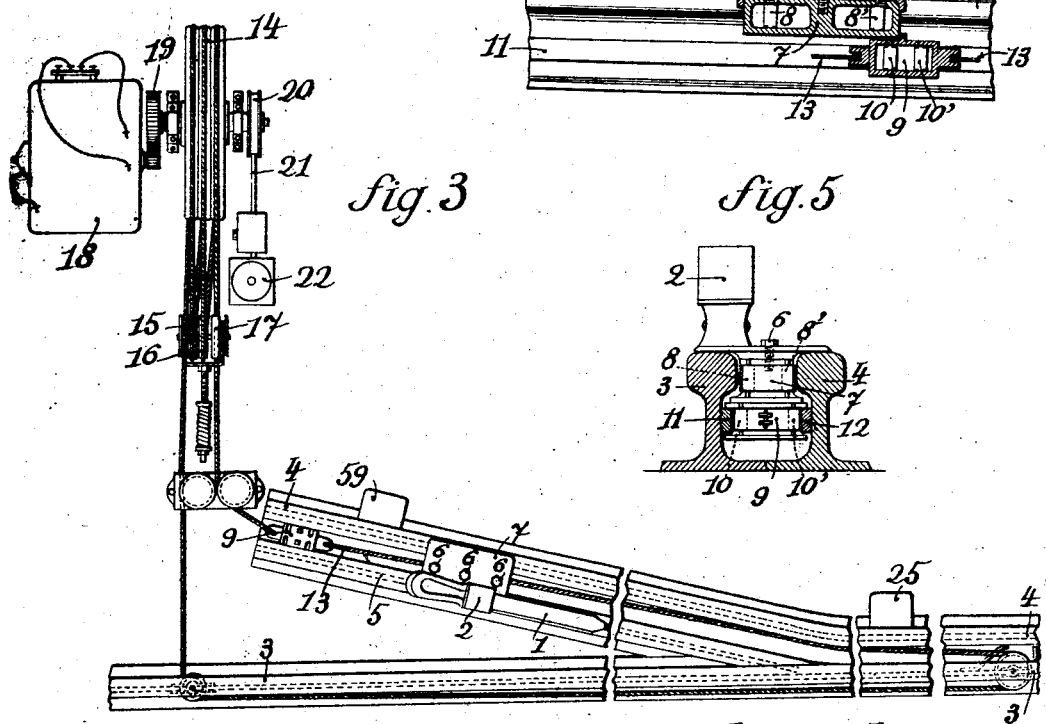
Fig. 3 is a plan view of the apparatus, showing its installation upon the track.

Figs. 3ª and 3ᵇ are, on a larger scale, partial plan views corresponding to Fig. 3.

Figure 1:
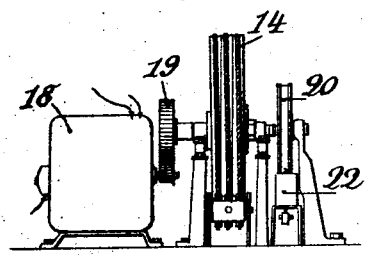
Fig. 1 is a front elevational view of a portion of the apparatus and Fig. 2 is a side view.
Figure 2:
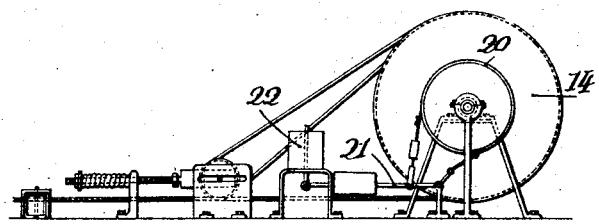
Figure 4:
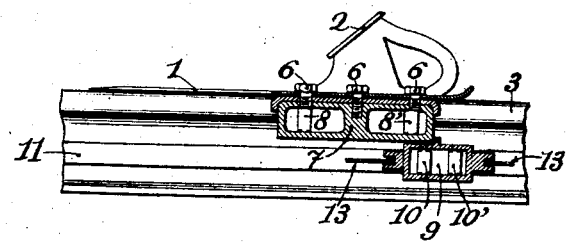
Figure 5:
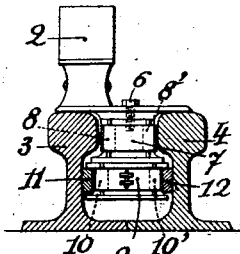

Figs. 4 and 5 show elevational and side views of the shoe and its driving carriage.

Fig. 6 is a diagrammatic view of the electric circuits.

Figure 7:
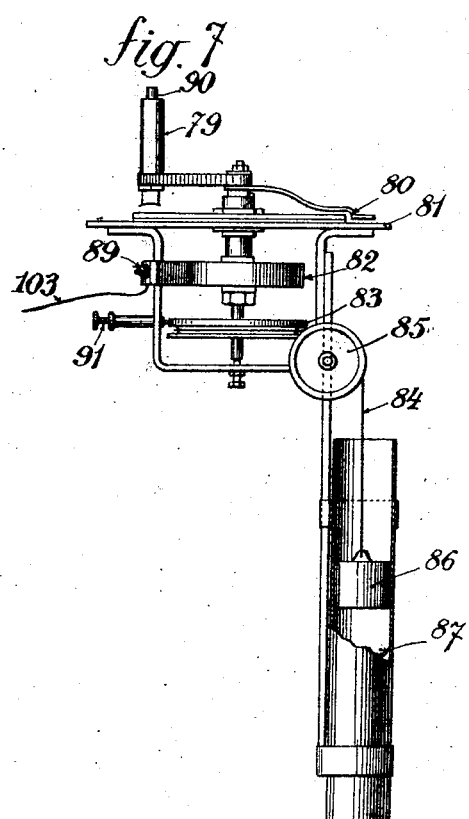

Fig. 7 is an elevational view of a new type of controller.

Figure 8:
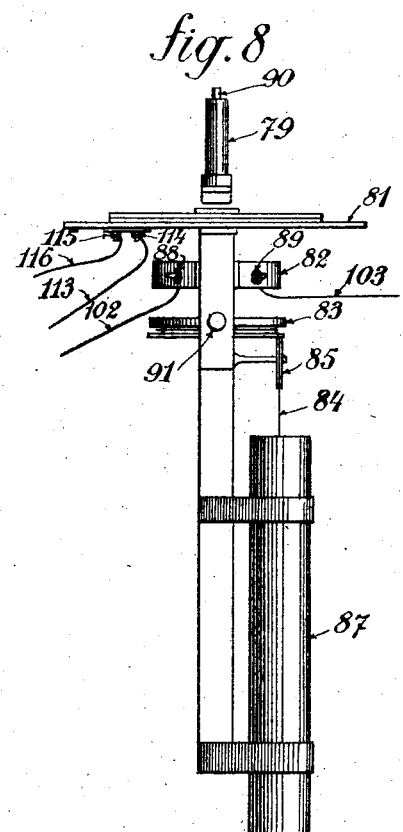
Figure 9:
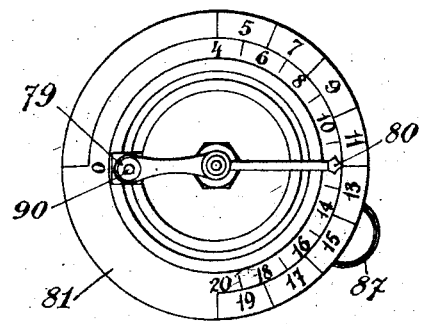

Fig. 8 is a side view of the same and Fig. 9 a plan view.

Fig. 10 is a diagrammatic view of the electric circuits of the species shown in Figs. 7, 8 and 9.

The said shoe comprises a steel bottom plate 1 whereof one end is thinned out and the other is terminated by a tappet 2 which comes into contact with the front wheel of the wagon. The said shoe is guided by the rail 3 of the track, provided with the guard rail 4 of variable length which is somewhat bent out at one end. At the beginning of the bent portion of the said guard rail and, parallel to this end, is disposed another rail 5 whereof one end is cut on a bevel at a very sharp angle and is adjusted against the head of the rail 3 so that the guiding will be continuous. The bottom plate of the said shoe is secured by a plurality of screws 6 to a sliding member 7 which is slidable in the guideway thus formed and whose lateral faces coincide with the profile of the heads of the two rails 4 and 5.

The two rollers 8 and 8' are fitted at each side of the said carriage, in order to facilitate the guiding of the said shoe in the guideway. The shoe and its sliding member 7 are entirely independent of a carriage 9 which serves to bring the same upon the track and whose lateral faces are also provided with the rollers 10 and 10'. The said entraining carriage is guided in the said guideway by two flat iron bars 11 and 12 which are riveted to the internal face of one of the two rails; the said carriage is secured to the ends of an endless cable 13 which passes around the whole length of the track apparatus and is then wound upon a winch 14 and disposed upon various pulleys 15, 16, 17 which form a pulley combination in order to increase the adhesion.

The winch 14 may be operated in either direction by an electric motor 18 with double winding $18^a$ and $18^b$, to which it is connected by means of a speed-reducing device 19. A friction brake co-operating with the drum 20, and whereof the lever 21 is controlled by an electro-magnet 22, is mounted at the end of the winch shaft. Since the opening and closing of the motor and the brake circuits is simultaneous, the brake will be lifted as soon as the motor starts, and will fall when the motor stops.

The motor and the brake circuits are opened and closed by the action of a relay provided with two contact devices 31 and 60 which are mounted in the cabin and are operated by a controller 28 whose various contact pieces are connected to the contact devices 23, 24, 25, 26, 27 mounted upon the guard rail 4 in order to determine the different positions which the said brake shoe may occupy, e. g. 5m. 6,50m. 8m. 10m. 12m.

The operation is as follows:

The control cabin should be preferably disposed above the apparatus. In the inoperative position, the brake shoe is disposed upon the siding track. When a wagon appears, the operator estimates its speed and determines the required braking distance; he then places the handle 29 of the controller 28 in the position corresponding to the determined distance. In the following example the distance of 8 metres, with connection to the contact device 25, will be taken as an example.

By pushing a button 30 disposed upon the handle 29, the operator closes the following circuit (circuit I) automatic contact circuit 31; incoming wire for the current 32; terminal 33; conductor 75; resistance lamp 34; conductor 76; automatic contact circuit 31; conductor 35; switch 36; conductor 37; contact device 23; conductors 38, 39, 40; contact device 25; conductor 41; terminal 42 of the controller; contact button 30; conductors 43, 44, 45, 46; return wire 47.

The automatic contact takes place by means of the small plate 48 which makes the contact, and the circuit is closed by the conductor 49 and not by the conductor 43; said contact not only brings the plate 48 into contact, but it also actuates the plate 50 (closing the circuit of the brake which is lifted) and the plate 51 (closing the circuit of the motor which actuates the carriage 9 and the brake shoe is thus drawn along the track).

The brake circuit (circuit II) is closed in the following manner: incoming wire 32; terminal 52; conductor 53; coil 22; conductor 54; contact plate 50; conductors 55, 56, 45, 46; return wire 47.

The circuit of the motor winding, for the direction of the rise of the carriage (circuit III) is closed as follows: incoming wire 32; conductor 57; motor $18^a$; conductor 58; contact plate 51; conductors 56, 45, 46; return wire 47.

When moving in the guideway, the carriage 9 actuating the shoe will first meet the contact device 59, thus closing the automatic contact circuit 60 (IV); incoming wire 32; terminal 33; conductor 75; resistance lamp 34; conductor 77; automatic contact 60; conductor 61; conductor 62; contact device 59; conductors 63 and 64; terminal 65; conductor 66; terminal 67; return wire 47. But although the circuit is closed, the automatic contact 60 will not be operated, since the two automatic contacts 31 and 60 of equal force are mounted in equilibrium upon the axle $a$ and as long as the circuit of the automatic contact is closed, the current can have no effect upon the automatic contact 60.

Continuing its movement in the guideway, the carriage 9 meets with the contact devices 27 and 26, whose circuits remain open, and then encounters the contact device 25, momentarily withdrawing the respective plate which connects the conductors 40 and 41, thus opening the circuit I. The automatic contact 31 is now released drawing with it the plates 48, 50 and 51 which open the brake circuit II and the motor circuit III. The release or dropping of the automatic contact 31 will instantly provide for the closing of the circuit IV and for the operation of the automatic contact 60. The plates 68, 69 and 70 come into contact, thus closing the circuit V of the reversal of the motor and the brake circuit VI. The circuit V comprises: the incoming wire 32; the conductor 71; the motor $18^b$; the conductor 74; the plate 69; the conductors 72 and 46; the return wire 47. The circuit VI comprises: the incoming wire 32; terminal 52; conductor 53; coil 22; conductor 54; plate 70; conductors 73, 72, 46; return wire 47.

When the motor is rotated in the contrary direction, the entraining carriage will be at once brought to the rear, and will leave the brake shoe upon the track. When arriving upon the siding track, the carriage again meets the contact device 59 and the circuit IV will thus be broken, withdrawing the plate 59 which connects together the conductors 62 and 63. Since the automatic contact 60 is no longer energized, the plates 69 and 70 will drop, breaking the circuit V, and thus stopping the motor $18^b$, and breaking the circuit VI, thus causing the brake 20 to drop.

The contact device 59 differs from the contact devices 23, 24, 25, 26 and 27. In these latter, the said plate resumes its contact after the passage of the carriage; but on the contrary the contact 59 is so disposed that the plate does not resume contact until it is put in place by the forward movement of the carriage. In order to prevent the wagon from coming into contact with the shoe while the latter is being placed in position, the whole apparatus and the track section preceding the same are electrically insulated. When a wagon comes upon the insulated rail at A, the relay 78 attracts the circuit-breaker 36, thus opening the circuit I; the automatic contact device is released, stopping the motor 18$^a$, and the automatic contact device 60 closes its circuit, starting the motor 18$^b$. The opening of the circuit I, which is caused by the switch 36, produces the same effect as if the circuit were broken by one of the contact devices 23, 24, 25, 26, 27; the shoe is stopped at any suitable distance which may be less than the determined distance, and the carriage returns to its storage quarters by way of the siding track. In this case, the braking is less effective, but there is no risk of damage to the apparatus.

It should be observed that during the whole time in which the wagon is situated upon the insulated rail section A—B it is impossible to close the circuit I and hence to replace the shoe upon the track. An improper operation of the controller handle 29 or of the button 30 will thus have no prejudicial consequences, since the shoe cannot return to the track before the last axle has left the point B. But the said shoe can be put in place as soon as the wagon has left the point B, thus providing for the braking of wagons which succeed each other at very frequent intervals. The motor group may be disposed forwardly or rearwardly of the apparatus. The length of the braking and the positions of the shoe may be increased or diminished according to the available space and the degree of the braking which it is desired to obtain. The motor and the brake may be supplied by continuous or alternating current.

In the apparatus herein described, the number of positions which the said shoe may occupy is limited to the number of the said contact devices.

In the form of construction hereinafter described with reference to Figs. 7 to 10, the controller above mentioned is replaced by an apparatus which is capable of providing for an infinite number of positions of the said shoe upon the whole length of the track apparatus, eliminating the contact devices, with the exception of those which are mounted for purposes of safety at the two ends of the braking region.

Further, the said apparatus is intended to simplify the electrical installation and to eliminate the band brake and drum, this being replaced by an automatic electric braking of the motor.

The new controller comprises: a handle 79 provided with a pointer 80, movable upon a graduated dial 81; said handle is secured to a shaft which it rotates. To the said shaft is keyed a drum 82 of an insulating substance which partially surrounds a copper ring, thus providing a small insulating portion at the periphery of the said drum. Below the drum 82 is mounted a grooved pulley 83. A small cable 84 is attached at one end to the groove of the pulley, and it actuates the latter before passing over the guiding pulley 85 and descending through the tube 87. A counterweight 86 which is vertically movable in the tube 87, is suspended at the other end of the said cable. Two contact pieces 88 and 89 bear upon the drum 82, each of which is connected with a wire of the circuit of the automatic contact controlling the rotation of the motor in the direction of the upward movement of the shoe.

The operation of the said controller is as follows:

When the handle 79 is in the inoperative position, one of the contact pieces (88, 89) is disposed upon the insulating sector of the drum 82. The displacement of the handle 79 upon the dial 81 rotates the drum 82, and the copper ring surrounding the same closes the circuit of the wires connected to the contact pieces 88 and 89. The rotation of the said handle causes the rotation of the grooved pulley 83 upon which is disposed the cable 84 which raises the counterweight 86. By simply pressing the button 90 disposed upon the handle 79, the exciting circuit for the automatic contact may be closed. At this moment the motor rotates, and the handle 79 is at once released; the weight 86 now descends slowly in the tube, and it thus returns the said handle to the initial position corresponding to the breaking of the circuit of the automatic contact.

The duration of the total descent of the weight 86 is regulated so as to correspond to the time which is necessary for the carriage to drive the said shoe from the siding track to the end of the track apparatus. All the intermediate positions of the said handle upon the graduated ring correspond to different heights of the said weight in the tube which serve to regulate the operation of the motor in proportion to the duration of the descent of the weight. The variations in the time of operation of the motor determine the variable positions of the shoe upon the whole length of the braking region.

The synchronism of the total descent of the weight 86 with the complete stroke of the said shoe is regulated by means of a pressure screw 91 which serves to brake the grooved pulley 83. A small valve 92 is mounted at the bottom of the tube 87 in order to provide for the admission of air at each rise of the said weight.

The device for actuating the said shaft carrying the drum 82 as above described is given solely by way of example. The said shaft may be rotated by any other means, mechanical or electrical, such as clockwork, the expansion of a spring, or the like, without departing from the principle of the invention. The elimination of the contact devices will simplify the electrical construction, and the number of line wires connecting the track apparatus to the devices in the cabin will thus be reduced.

Fig. 10 shows an arrangement of circuits utilizing the double-wound motor, the rocking relay, the track relay and the contact devices for the end positions as above described.

The operation is as follows:

After placing the pointer 80 of the handle 79 in the desired position upon the graduated dial 81, the operator pushes the button 90 disposed upon the handle 79; he then closes the following circuit (No. I) of the automatic contact 93: incoming wire 96; terminal 97; conductor 98; resistance lamp 95; conductor 99; terminal 100; conductor 101; automatic contact coil 93; conductor 102; contact piece 88; copper ring on the drum 82; contact piece 89; conductor 103; terminal 104; conductor 105; switch for the track relay 106; conductor 107; contact device 108; conductor 109; terminal 110; conductor 111; terminal 112; contact device 113; controller terminal 114; button 90; controller terminal 115; conductor 116; terminal 117; conductor 118; terminal 119; conductor 120; terminal 121; return wire 122.

The automatic contact takes place, and the plates 123 and 124 come into contact. The circuit No. I of the automatic contact coil 93 is now closed by the conductor 125, the plate 123 and the conductors 126, 127, 128, instead of being closed by the conductor 113, the terminal 114, the button 90, the terminal 115, the conductor 116, the terminal 117 and the conductor 118.

The contact between the plate 124 and the conductor 129 has the effect of closing the circuit II of the winding of the motor, which rotates in the proper direction in order to draw the said carriage upon the track; incoming wire 96; terminal 97; conductor 130; terminal 131; conductor 132; terminal 133; conductor 134; armature 135; field 136; conductor 137; terminal 138; conductor 139; terminal 140; conductor 129; plate 124; conductors 126, 127, 128; terminal 119; conductor 120; terminal 121; return wire 122.

The descent of the said weight causes the rotation of the drum 82; when the latter has completely descended, the handle 79 will have returned to the initial position, and contact between the pieces 88 and 89 is broken by means of the insulating sector 82.

The circuit No. I of the automatic contact 93 is broken. The plate 124 is withdrawn from the conductor 129, thus opening circuit No. II of the motor, and the latter is now stopped. The circuit may also be broken by the bending of the plate of the contact device 108 during the passage of the said carriage, should the controller be out of order or fail to work. The circuit may also be broken by the action of the switch 106 of the track relay, should the wagon proceed upon the insulated rail before the handle 79 has returned to the initial position.

In its displacement, the carriage driving the said shoe has in the first place cleared the contact device 141 which has closed the circuit of the automatic contact coil 94: incoming wire 96; terminal 97; conductor 98; resistance lamp 95; conductor 99; terminal 100; conductor 142; coil 94; conductor 143; terminal 144; conductor 145; terminal 146; conductor 147; contact device 141; conductor 148; terminal 149; conductor 150; terminal 121; return wire 122.

But although the circuit is closed, the automatic contact device will only act at the moment when the automatic contact circuit 93 is broken; at this time the plate 151 comes into contact with the conductor 152, closing the following circuit (No. IV) whereby the motor is caused to rotate in the proper direction to bring the carriage upon the siding track: incoming wire 96; terminal 97; conductor 130; terminal 131, conductor 132, terminal 133, conductor 134, armature 135; field 153; conductor 154; terminal 155; conductor 152; plate 151; conductors 160, 127, 128; terminal 119; conductor 120; terminal 121; return wire 122.

When the said carriage meets with the contact device 141, this will break the circuit No. III of the automatic contact 94. The plate 151 now falls, breaking circuit No. IV of the motor. The armature 135 continues to rotate by reason of the motion of the drum. At this moment, the relay arm comes into equilibrium, and a friction member 156 secured to one end of the said arm connects the terminals 157 and 158 of a conductor 159 which closes the circuit No. V as follows: terminal 131; conductor 132; terminal 133; conductor 134; armature 135; field 136; conductor 137; terminal 138; conductor 139; terminal 140; conductor 159 whose ends 157 and 158 are connected by the contact member 156.

When the circuit No. V is closed, the motor acts as a shunt-wound dynamo whose external circuit is open. The current produced by the armature 135 will flow in the field 136 at the expense of the kinetic energy of the system, and will cause the practically instantaneous stopping of the motor group.

Claims—

1. A device for the braking of railroad wagons upon sorting tracks, comprising in combination with one of the rails of the sorting track, guide rails forming a guideway whereof one portion is parallel to the said track and the other portion is oblique, a shoe normally placed in the said oblique portion and slidable in the said guideway and comprising a portion which extends upon the track rail when the said shoe is brought into that part of the guideway which is parallel to the track, the said portion being adapted for engagement with the front wheel of the first wagon of a series of wagons rolling upon the main track and proceeding towards the oblique portion of the guideway, a carriage slidable in the said guideway and adapted to draw the said shoe forward in the opposite direction to that followed by the wagon to be braked, a motor, means actuated by the said motor and connected with the said carriage whereby the latter is caused to travel in one and the other direction at will, and controlling means operated at a distance from the track and adapted to control the operation of the said motor in either direction as well as the stopping of the motor.

2. A device for the braking of railroad wagons upon sorting tracks, comprising in combination with one of the rails of the sorting track, guide rails forming a guideway whereof one portion is parallel to the said track and the other portion is oblique, a shoe normally placed in the said oblique portion and slidable in the said guideway and comprising a portion which extends upon the track rail when the said shoe is brought into that part of the guideway which is parallel to the track, the said portion being adapted for engagement with the front wagon of a series of wagons rolling upon the main track and proceeding towards the oblique portion of the guide rail, a carriage slidable in the said guideway and adapted to draw the said shoe forward in an opposite direction to that followed by the wagon to be braked, a motor, a cable whose ends are attached to the front and rear of the said carriage respectively, means for guiding the said cable along the said rails, a drum actuated by the said motor and having the said cable wound thereon, and controlling means operated at a distance from the track and adapted to control the operation of the said motor in either direction as well as the stopping of the motor.

3. A device for the braking of railroad wagons upon sorting tracks, comprising in combination with one of the rails of the sorting track, guide rails forming a guideway whereof one portion is parallel to the said track and the other portion is oblique, a shoe normally placed in the said oblique portion and slidable in the said guideway and comprising a portion which extends upon the track rail when the said shoe is brought into that part of the guideway which is parallel to the track, the said portion being adapted for engagement with the front wheel of the first wagon of a series of wagons rolling upon the main track and proceeding towards the oblique portion of the guideway, a carriage slidable in the said guideway and adapted to draw the said shoe forward in the opposite direction to that followed by the wagon to be braked, an electric motor, means actuated by the said motor and connected with the said carriage whereby the latter is actuated in either direction, a hand-operated electric button disposed at a distance from the track, electric contact devices spaced along the said guide rails, and electric controlling means connected to the said button and the said contact devices and adapted to control the operation of the said motor in either direction as well as the stopping of the motor.

4. A device for the braking of railroad wagons upon sorting tracks, comprising in combination with one of the rails of the sorting track, guide rails forming a guideway whereof one portion is parallel to the said track and the other portion is oblique, a shoe normally placed in the said oblique portion and slidable in the said guideway and comprising a portion which extends upon the track rail when the said shoe is brought into that part of the guideway which is parallel to the track, the said portion being adapted for engagement with the front wheel of the first wagon of a series of wagons rolling upon the main track and proceeding towards the oblique portion of the guideway, a carriage slidable in the said guideway and adapted to draw the said shoe forward in the opposite direction to that followed by the wagon to be braked, an electric motor, means actuated by the said motor and connected with the said carriage whereby the latter is actuated in either direction, a hand-operated electric button disposed at a distance from the track, electric contact devices spaced along the said guide rails, and electric controlling means connected to the said button and the said contact devices and adapted to control the operation of the said motor in either direction as well as the stopping of the motor, the portion of the track rails preceding the said guide rails being electrically insulated, and controlling means adapted to reverse the motor when the first wagon of the series of wagons comes upon the said insulated portion of the rails, in order to effect the backward motion of the said carriage before the said shoe is engaged by the front wheel of the said wagon.

5. A device for the braking of railroad wagons upon sorting tracks, comprising in combination with one of the rails of the sorting track, guide rails forming a guideway whereof one portion is parallel to the said track and the other portion is oblique, a shoe normally placed in the said oblique portion and slidable in the said guideway and comprising a portion which extends upon the track rail when the said shoe is brought into that part of the guideway which is parallel to the track, the said portion being adapted for engagement with the front wheel of the first wagon of a series of wagons rolling upon the main track and proceeding towards the oblique portion of the guideway, a carriage slidable in the said guideway and adapted to draw the said shoe forward in the opposite direction to that followed by the wagon to be braked, a motor, a cable whose ends are attached to the front and rear of the said carriage respectively, means for guiding the said cable along the said rails, a drum actuated by the said motor and having the said cable wound thereon, and controlling means operated at a distance from the track and adapted to control the operation of the said motor in either direction as well as the stopping of the motor said controlling means comprising an element having a certain weight, operating means for raising the said weighted element to a height which is variable at will, adjustable means for slowing down the descent of the said element, and electric contact means controlled by the said weighted element, for the control of the said motor and the stopping of the same at the end of a time corresponding to the descent of the said element.

In testimony, that we claim the foregoing as our invention, we have signed our names.

FERNAND DELOISON.
JOSEPH DEYON.